(12) United States Patent
Chen (10) Patent No.: US 11,508,516 B2
(45) Date of Patent: Nov. 22, 2022

(54) WIRELESS CHARGING MODULE AND ELECTRONIC DEVICE THEREOF

(71) Applicant: KUNSHAN LIANTAO ELECTRONIC CO., LTD, Kunshan (CN)

(72) Inventor: Chen Chen, Kunshan (CN)

(73) Assignee: KUNSHAN LIANTAO ELECTRONIC CO., LTD, Kunshan (CN)

( * ) Notice: Subject to any disclaimer, the term of this patent is extended or adjusted under 35 U.S.C. 154(b) by 311 days.

(21) Appl. No.: 16/829,912

(22) Filed: Mar. 25, 2020

(65) Prior Publication Data
US 2021/0125774 A1    Apr. 29, 2021

(30) Foreign Application Priority Data

Oct. 25, 2019   (CN) .......................... 201911025753.7

(51) Int. Cl.
| | |
|---|---|
| *H02J 7/00* | (2006.01) |
| *H01F 27/29* | (2006.01) |
| *H02J 50/10* | (2016.01) |
| *H02J 50/70* | (2016.01) |
| *H01F 27/36* | (2006.01) |
| *H01F 38/14* | (2006.01) |
| *H02J 7/02* | (2016.01) |

(52) U.S. Cl.
CPC .............. *H01F 27/29* (2013.01); *H01F 27/36* (2013.01); *H01F 38/14* (2013.01); *H02J 7/02* (2013.01); *H02J 50/10* (2016.02); *H02J 50/70* (2016.02)

(58) Field of Classification Search
USPC ........ 320/106, 107, 108, 109, 110, 112, 134
See application file for complete search history.

(56) References Cited

FOREIGN PATENT DOCUMENTS

| CN | 207896276 U | * | 9/2018 | ....... G06K 19/07749 |
|---|---|---|---|---|
| CN | 20853865 U | | 2/2019 | |
| CN | 208538654 U | | 2/2019 | |
| CN | 208674377 U | * | 3/2019 | ....... G06K 19/07779 |
| CN | 109659119 A | | 4/2019 | |
| CN | 109804443 A | | 5/2019 | |
| DE | 112016004763 T5 | * | 7/2018 | ............. H01F 38/14 |
| WO | WO-2012172813 A1 | * | 12/2012 | ........... B65H 65/005 |

* cited by examiner

*Primary Examiner* — Brian Ngo
(74) *Attorney, Agent, or Firm* — Birch, Stewart, Kolasch & Birch, LLP (57) ABSTRACT

The present disclosure is related to a wireless charging module and an electronic device thereof. The wireless charging module includes a base, at least one magnetic shielding sheet, and a coil. The base includes at least two metal melting regions. Each metal melting region includes an opening, and a blocking region disposed at the opening. The magnetic shielding sheet is disposed on the base. The magnetic shielding sheet partially exposes the two metal melting regions and the openings. The coil is disposed on the magnetic shielding sheet. The coil includes two leads. The two leads are respectively disposed on the two metal melting regions. The two leads are disposed in the blocking regions and the openings. The electronic device includes the wireless charging module and a power supply. The wireless charging module is electrically connected to the power supply.

18 Claims, 7 Drawing Sheets

WIRELESS CHARGING MODULE AND ELECTRONIC DEVICE THEREOF

CROSS REFERENCE TO RELATED APPLICATION

This application claims the priority benefit of Chinese Patent Application Serial Number 201911025753.7, filed on Oct. 25, 2019, the full disclosure of which is incorporated herein by reference.

BACKGROUND

Technical Field

The present disclosure relates to the technical field of wireless charging, and more particularly to a wireless charging module and electronic device thereof for preventing tin liquid from flowing to a wireless charging coil.

Related Art

The wireless charging technology is a type of wireless power transmission technology. By near-field sensing, the energy is transmitted by a power supply device (charger) to a powered device that uses the received energy to charge the battery and simultaneously to operate the powered device. Wireless charging technology has the advantages of being safe, reliable, and convenient, and it could charge multiple electronic products at the same time without charging power cords. Also, different electronic products can be charged with the same wireless charging device. With the development of wireless charging technology, the use of coils has become more and more popular. The process of pre-tinning the coil conductor is necessary for testing the performance of the coil and combining the coil and other connectors.

Conventionally, when assembling the wireless charging module, the ferrite and the coil would be firstly assembled, and then the ferrite is welded to the base. During the welding process, the leads of the coil are firstly tinned, and the leads are then combined to the base. However, the liquid tin, which is formed by melting the tin, on leads is pretty much flowable, and when the liquid tin flows to be in touched with the coil, the product is then flawed. The current method mainly focuses on testing of products, followed by eliminating products failed to pass the testing. Unfortunately, no proper solutions have been introduced so far for improving the rate of failure. Therefore, it is desirous to develop a solution to solve the problem that the liquid tin flows to the coil when the coil is welded to the base.

SUMMARY

The embodiment of the present disclosure provides a wireless charging module that solves the problem that the wireless charging module is flawed because the liquid tin from the leads flows to the wireless charging coil when the coil is welded to the base.

The present disclosure provides a wireless charging module comprising a base, at least one magnetic shielding sheet, and a coil. The base comprises at least two metal melting regions. Each of the metal melting regions comprises an opening, and a blocking region is disposed at the opening. The magnetic shielding sheet is disposed on the base. The magnetic shielding sheet partially exposes the two metal melting regions and the opening. The coil is disposed on the magnetic shielding sheet. The coil comprises two leads. The two leads are respectively disposed on the two metal melting regions and are located in the blocking regions and the openings.

In an embodiment of the present disclosure, the wires of coils could be disposed on the two metal melting regions. The two leads of the wire are close to the opening. The leads and the blocking regions are kept by a distance. When both metal melting regions are plated with a metal layer (such as gold), the blocking region can be plated with a metal layer (such as nickel). The plated metal material of the metal melting region is different from the plated metal material of the blocking region. After the two leads are respectively soldered and are placed in the two metal melting regions, the tin on the two leads turns to liquid phase during the melting process. This liquid tin would only flow within the two melting metal regions and would be blocked by the inner edge of the blocking region when passing through the openings. Thus, the liquid tin would not be flowing to be in touch with the wireless charging coil, ensuring that the quality of the wireless charging module to be flawless.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only include these elements, but also includes other elements not specified expressly, or may include inherent elements of the process, method, object, or device. If no more limitations are made, an element limited by "include a/an . . ." does not exclude other same elements existing in the process, the method, the article, or the device which includes the element.

In the following embodiment, the same reference numerals are used to refer to the same or similar elements throughout the invention.

Figure 1:
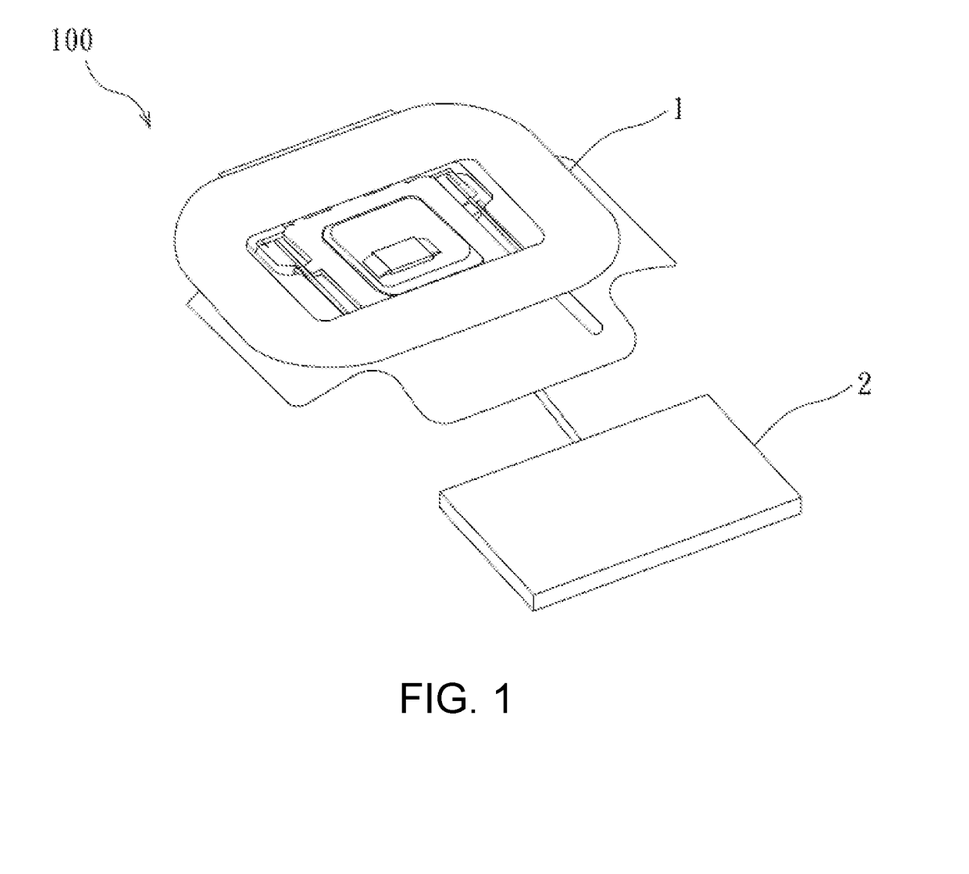
FIG. 1 is a schematic diagram of an electronic device of the present disclosure.
Figure 2:
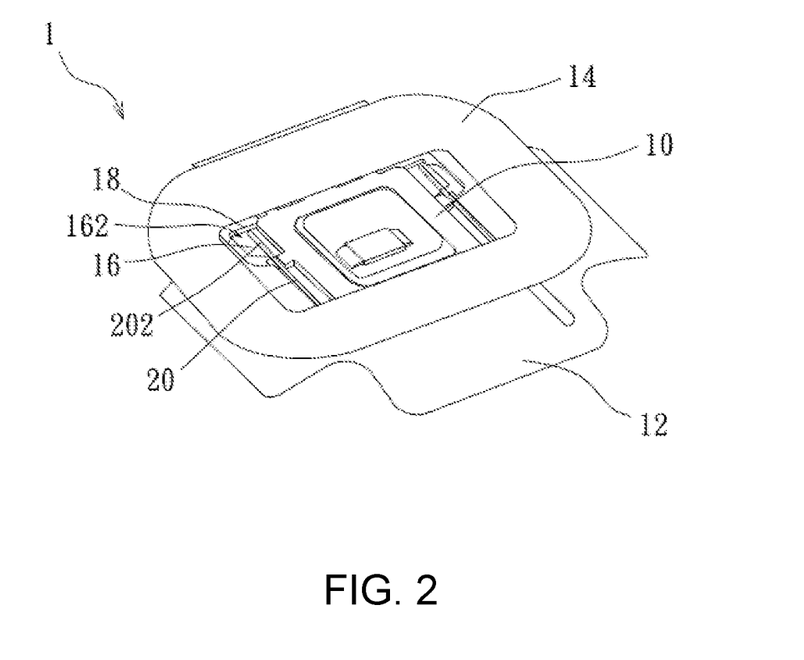
FIG. 2 is a perspective view of the wireless charging module of the present disclosure.
Figure 3:
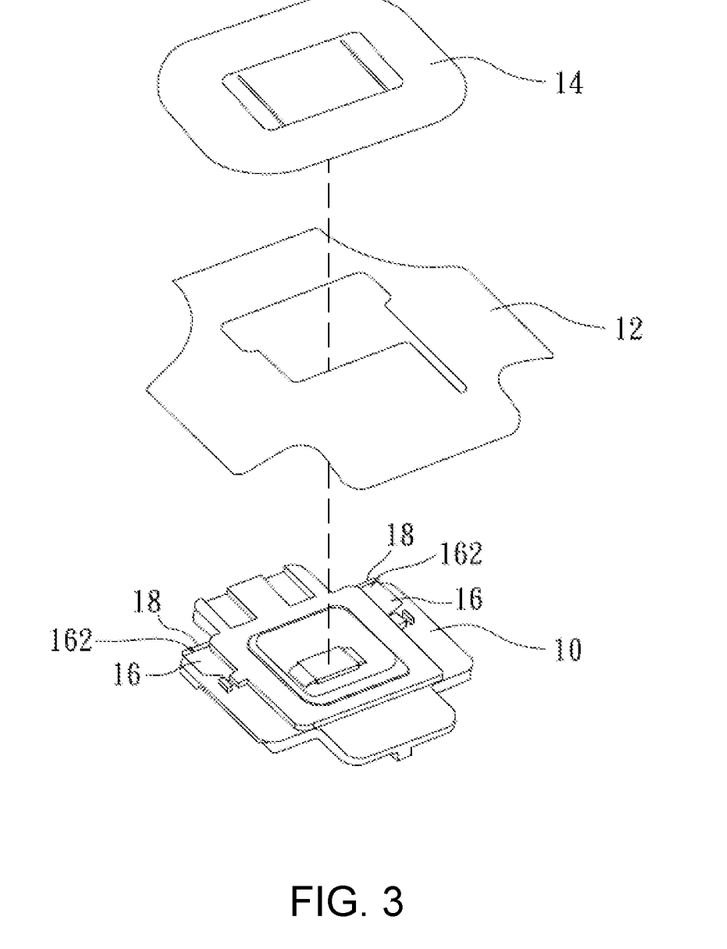
FIG. 3 is an exploded perspective view of FIG. 2.

The present disclosure improves the design of tinning parts so as to solve the issue of tin bonding while soldering of the conventional wireless charging coil. The components and the combinations of the components of the present disclosure are described with FIGS. 1-3. FIG. 1 is a schematic diagram of an electronic device of the present disclosure. FIG. 2 is a perspective view of the wireless charging module of the present disclosure. FIG. 3 is an exploded perspective view of FIG. 2. The electronic device 100 comprises a wireless charging module 1 and a power supply 2. The wireless charging module 1 is electrically connected to the power supply 2. Thus, the power supply 2 can be charged by the wireless charging module 1. The wireless charging module 1 comprises a base 10, at least one magnetic shielding sheet 12, and a coil 14. The base 10 comprises at least two metal melting regions 16, each of the metal melting regions 16 has an opening 162, and a blocking region 18 is disposed at the opening 162. The magnetic shielding sheet 12 is disposed on the base 10, and the magnetic shielding sheet 12 partially exposes the two metal melting regions 16 and the openings 162, that is, the central portion of the magnetic shielding sheet 12 could be hollowed out. The magnetic shielding sheet 12 is designed according to the structure of the base 10 and the annular part of the coil 14. That is, the coil 14 is disposed on the magnetic shielding sheet 12, and the coil 14 is an annular part. Therefore, the coil 14 also partially exposes the body of the base 10 and the two metal melting regions 16 and the openings 162, which are located on the base 10. In this embodiment, the overall size of the magnetic shielding sheet 12 is larger than the size of the base 10. Therefore, in addition to the exposed area, other portions of the magnetic shielding sheet 12 covers the base 10, and the size of the coil 14 is smaller than the size of the magnetic shielding sheet 12. Since the coil 14 can emit and receive energy for energy transferring, it mainly applies the principle of electromagnetic induction to transfer energy by energy coupling through the coil. Such coil 14 emits a high-frequency magnetic flux, and therefore, the magnetic shielding sheet 12 can be made of ferrite or soft magnetic metal material with specific characteristics for high-frequency purposes. In addition to shielding the high-frequency magnetic flux outputted from the coil 14, it can also absorb and shield the magnetic flux from the magnet. Not only it can efficiently focus the magnetic field lines to improve power transmission efficiency, but also suppress the noise generation.

Figure 4:
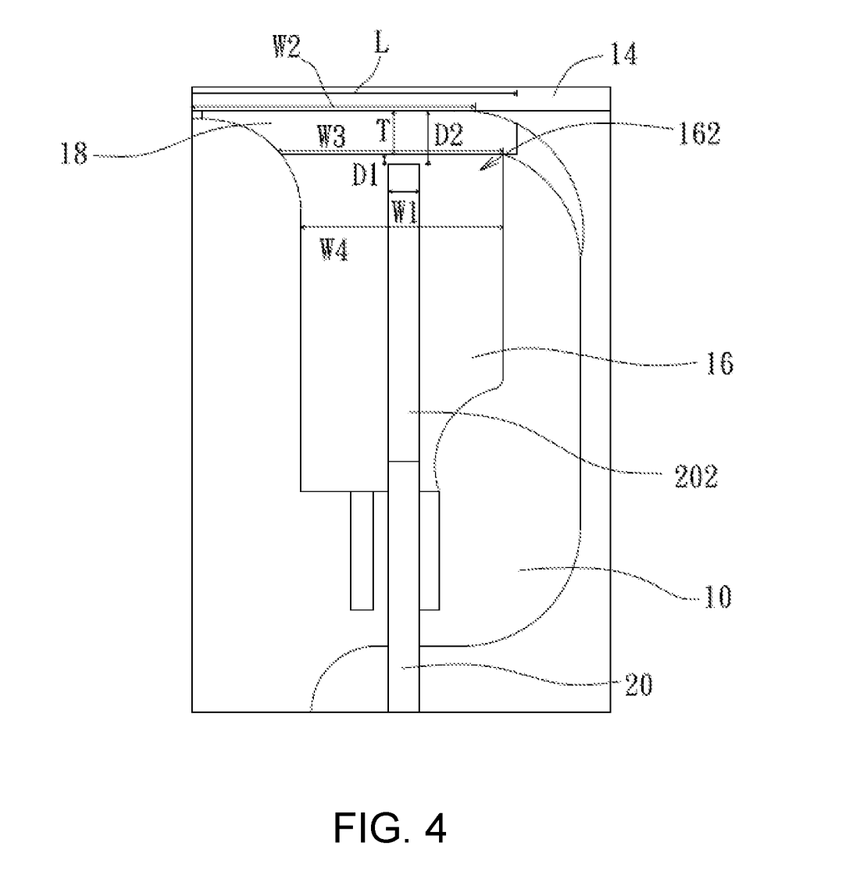
FIG. 4 is a partially enlarged view of FIG. 2.

The coil 14 is made by the process of winding the wire 20. The winding process is an existing art and will not be described in detail herein. The two leads 202 of the wire 20 are respectively disposed on the two metal melting regions 16 and are disposed in the blocking regions 18 and the openings 162. The lead 202 is closed to the opening 162, and the lead 202 is kept from the blocking area 18 by a distance. Referring to FIG. 4, which is a partial enlarged view of FIG. 2, the lead 202 is separated from the blocking region 18 by a first distance D1 on the extending direction of the lead 202, and the lead 202 is separated from the coil 14 by a second distance D2 on the extending direction of the lead 202, and the first distance D1 is shorter than the second distance D2. The first distance D1 is 0.4 times to 1 time the width $W_1$ of the lead 202, for example, 0.4 times, 0.5 times, 0.6 times, 0.7 times, 0.8 times, 0.9 times or 1 time. The second distance D2 is 1.5 times to 2 times the width $W_1$ of the lead 202, for example, 1.5 times, 1.6 times, 1.7 times, 1.8 times, 1.9 times or 2 times. The length L of the blocking region 18 is 0.2 times to 1 time the width $W_2$ of the blocking region 18, for example, 0.2 times, 0.203 times, 0.3 times, 0.4 times, 0.5 times, 0.6 times, 0.7 times, 0.8 times, 0.9 times or 1.0 time. The thickness T of the blocking region 18 is 2 times to 3 times the width $W_1$ of the lead 202, for example, 2 times, 2.1 times, 2.2 times, 2.3 times, 2.4 times, 2.5 times, 2.6 times, 2.7 times, 2.8 times, 2.9 times or 3 times. In some embodiments of the present disclosure, the first distance D1 is 0.4 times to 0.5 times the width $W_1$ of the lead 202, for example, 0.4 times, 0.45 times or 0.5 times. In some embodiments of the present disclosure, the second distance D2 is 1.6 times to 2 times the width $W_1$ of the lead 202, for example, 1.6 times, 1.7 times, 1.8 times, 1.9 times or 2 times. In one embodiment of the disclosure, since the blocking region 18 is disposed between the inner ring edge of the coil 14 and the opening 162, and the width $W_2$ of the blocking region 18 is greater than the width $W_3$ of the opening 162, the distance between the lead 202 of the two wires 20 and the inner ring edge of the coil 14 is 0.45 cm. When the thickness $W_2$ of the blocking region 18 is 0.35, the distance between the lead 202 of the two wires 20 and the inner edge of the blocking region 18 is 0.1. The width $W_4$ of each metal melting region 16 is 4 to 5 times the width $W_1$ of each lead 202. For example, the width $W_4$ of each metal melting region 16 is 0.68 to 0.72, and the width $W_1$ of the lead 202 of each wire 20 is 0.25. The ratio of the width is designed according to various shapes of tinning for the lead 202, such as a circle, a triangle, a T-shape or any geometric shapes.

Figure 5:
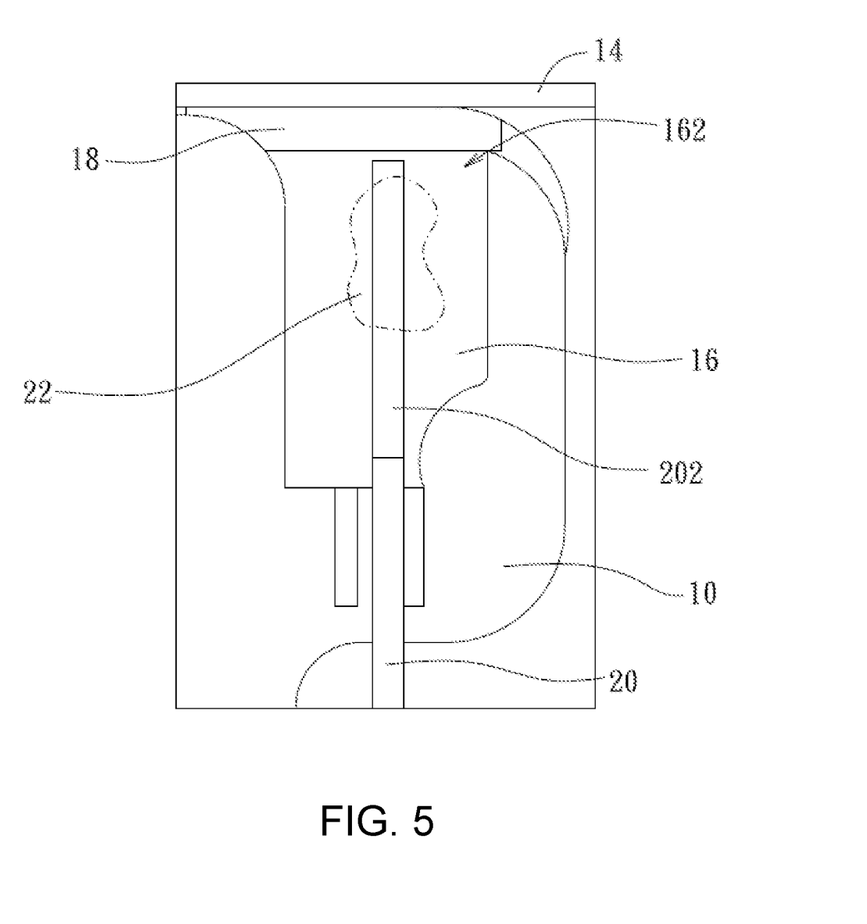
FIG. 5 is a schematic view of tinning of one embodiment of the present disclosure.

The height of the two metal melting regions 16 is 1.3 so the height of the blocking region 18 is greater than 1.3 When both metal melting regions 16 are plated with a metal layer, taking gold as an example, the gold plating has the advantages of good ductility, easy polishing, high-temperature resistance, long storage life and good resistance to discoloration; and of course, the metal layer can also be a layer of tin, because the liquid tin formed during the melting process of the wire tinning is also compatible with the tin plating layer. Therefore, the metal layer of the two metal melting regions 16 is not limited here by using a gold plating method or a tin plating method. The material of the metal melting region 16 is selected from the group consisting of gold and tin. The blocking region 18 can be plated with a metal layer, taking nickel as an example, the nickel plating layer has the advantages of high hardness, high wear resistance, high chemical stability, and etc. Thus, in one embodiment of the disclosure, the metal material plated on the metal melting region 16 is different from the metal material plated on the blocking region 18. Referring to FIG. 5, which is a schematic view of tinning of one embodiment of the present disclosure, after the two leads 202 are respectively tinned, they are disposed in the two metal melting regions 16. The tin 22 on the two leads 202 turns to liquid phase during the melting process, and the liquid tin flows only within the two metal melting regions 16. When the liquid tin flows through the opening 162, the liquid tin is blocked by the blocking area 18, so the tin 22 does not flow to the coil 14, thus ensuring the quality of the product. In addition, the two leads 202 of the embodiment only need to be bent once. Not only it simplifies the manufacturing process of the wireless charging module, but also further ensures the quality of the wireless charging module produced.

Figure 6:
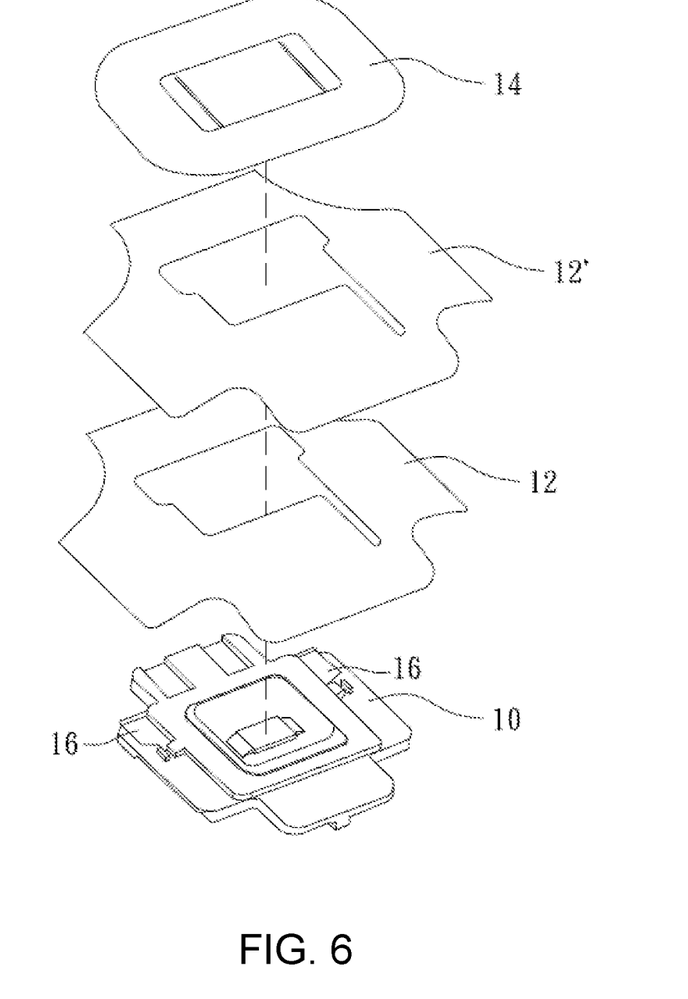
FIG. 6 is another exploded perspective view of the wireless charging module of the present disclosure.

FIG. 6 is another exploded perspective view of the wireless charging module of the present disclosure. In this embodiment, the inner arrangement of the wireless charging module is identical or similar to those described above, so the same points are not described herein again and only the differences would be explained in the following. Since the magnetic shielding sheet 12 is configured with a high induction magnetic field and is configured for shielding the coil 14, the characteristics and thickness of the magnetic shielding sheet 12 are designed in conjunction with the coil 14. It is because, if the thickness of the magnetic shielding sheet 12 is too thin, the magnetic saturation problem may occur. The magnetic saturation could result in sudden decrease of the inductance of the coil 14, which may cause an obstacle to the wireless charging. Therefore, in addition to using a magnetic shielding sheet 12 as described above, it is also possible to add a plurality of magnetic shielding sheets according to requirements. In this embodiment, there are two magnetic shielding sheets, and the two magnetic shielding sheets 12 and 12' are disposed on the base 10. The structures of the two magnetic shielding sheets 12 and 12' may be identical, and the magnetic shielding sheets 12 and 12' are correspondingly overlapped. In this embodiment, the coil 14 is disposed on the second magnetic shielding sheet 12', that is, the magnetic shielding sheet 12' is disposed between the magnetic shielding sheet 12 and the coil 14. It further improves the performance of the shielding coil 14 to emit high-frequency magnetic flux by increasing the thickness of the magnetic shielding sheet, which is achieved by using the two magnetic shielding sheets 12 and 12'.

Figure 7:
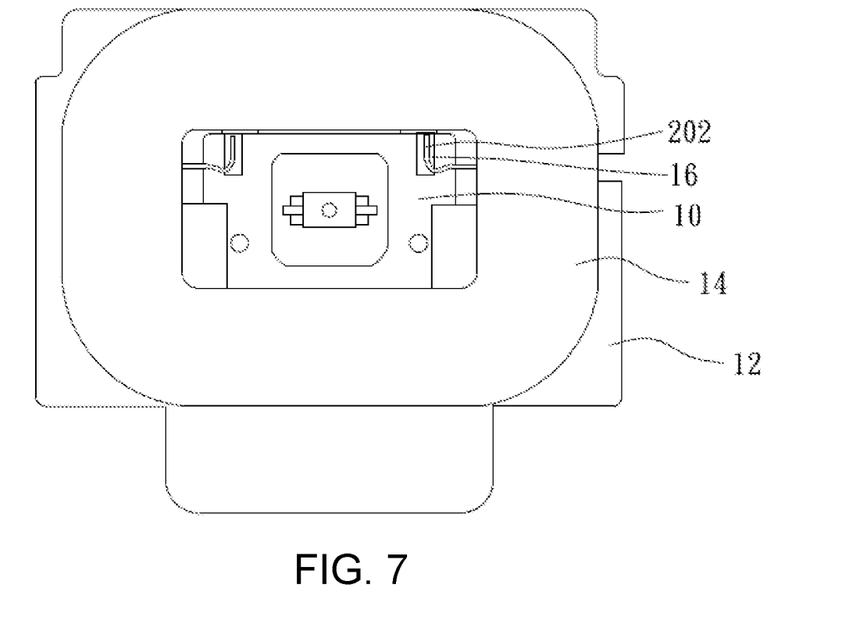
FIG. 7 is a schematic diagram of the wireless charging module of another embodiment of the present disclosure.

In the above description, the two leads 202 of the wire 20 are disposed on the two metal melting regions 16 in a nearly parallel manner, although the disclosure is not limited thereto. In other embodiments, the relative position between the two leads 202 of the wire 20 can also be in any other form, as shown in FIG. 7, which is a schematic diagram of the wireless charging module of another embodiment of the present disclosure.

In summary, the present disclosure provides a wireless charging module in which the width of the two metal melting regions 16 is wide enough to provide the tinned shape appearance required for the design of the lead 202. The lead 202 is closed to the opening 162, and the lead 202 is kept from the blocking area 18 by a distance. When both metal melting regions 16 are plated with a metal layer, the blocking region 18 can be plated with a metal layer, in which the metal material of the metal layer plated on the metal melting region is different from that plated on the blocking region with different chemical properties. The metal layer plated on the blocking region 18 is incompatible with the tin on the lead 202. The leads 202 of the two wires 20 are respectively tinted and then are placed in the two metal melting regions 16. The tin on the two leads 202 turns to liquid phase during the melting process, and the liquid tin flows only within the two metal melting regions 16. When flowing through the openings 162, the liquid tin is blocked by the blocking area 18, so the liquid tin does not flow to be in touched with the coil, thus the quality of the product could be ensured.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A wireless charging module, comprising:
  a base, comprising at least two metal melting regions, each of the metal melting region having an opening, and a blocking region being disposed at the opening;
  at least one magnetic shielding sheet disposed on the base, the magnetic shielding sheet partially exposing the two metal melting regions and the openings; and
  a coil, disposed on the magnetic shielding sheet, the coil comprising two leads, and the two leads being respectively disposed on the two metal melting regions and located in the blocking regions and the openings.

2. The wireless charging module according to claim 1, wherein the leads are separated from the blocking area by a first distance on the extending direction of the leads; the leads are separated from the coil by a second distance on the extending direction of the leads; the first distance is shorter than the second distance.

3. The wireless charging module according to claim 2, wherein the first distance is 0.4 times to 1.0 times the width of the lead.

4. The wireless charging module according to claim 2, wherein the second distance is 1.5 times to 2.0 times the width of the lead.

5. The wireless charging module according to claim 1, wherein the length of the blocking region is 0.2 times to 1.0 times the width of the blocking region.

6. The wireless charging module according to claim 1, wherein the thickness of the blocking region is 2.0 times to 3.0 times the width of the lead.

7. The wireless charging module according to claim 1, wherein the material of the metal melting region is selected from the group consisting of gold and tin.

8. The wireless charging module according to claim 1, wherein the blocking region is made of nickel.

9. The wireless charging module according to claim 1, wherein the width of the blocking region is greater than or equal to the width of the opening.

10. An electronic device, comprising:
a wireless charging module comprising:
   a base, comprising at least two metal melting regions, each of the metal melting region having an opening, and a blocking region being disposed at the opening;
   at least one magnetic shielding sheet disposed on the base, the magnetic shielding sheet partially exposing the two metal melting regions and the openings; and
   a coil, disposed on the magnetic shielding sheet, the coil comprising two leads, and the two leads being respectively disposed on the two metal melting regions and being located in the blocking regions and the openings; and
a power supply;
wherein the wireless charging module is electrically connected to the power supply.

11. The electronic device according to claim 10, wherein the leads are separated from the blocking area by a first distance on the extending direction of the leads; the leads are separated from the coil by a second distance on the extending direction of the leads; the first distance is shorter than the second distance.

12. The electronic device according to claim 11, wherein the first distance is 0.4 times to 1.0 times the width of the lead.

13. The electronic device according to claim 11, wherein the second distance is 1.5 times to 2.0 times the width of the lead.

14. The electronic device according to claim 10, wherein the length of the blocking region is 0.2 times to 1.0 times the width of the blocking region.

15. The electronic device according to claim 10, wherein the thickness of the blocking region is 2.0 times to 3.0 times the width of the lead.

16. The electronic device according to claim 10, wherein the material of the metal melting region is selected from the group consisting of gold and tin.

17. The electronic device according to claim 10, wherein the blocking region is made of nickel.

18. The electronic device according to claim 10, wherein the width of the blocking region is greater than or equal to the width of the opening.

* * * * *